United States Patent [19]

Kawata

[11] Patent Number: 5,730,900
[45] Date of Patent: Mar. 24, 1998

[54] FILM AND PROCESS FOR PREPARATION OF THE SAME AND LIQUID CRYSTAL DISPLAY

[75] Inventor: Ken Kawata, Kanagawa, Japan

[73] Assignee: Fuji Photo Film Co., Ltd., Minami-ashigara, Japan

[21] Appl. No.: 662,760

[22] Filed: Jun. 10, 1996

[30] Foreign Application Priority Data

Jun. 8, 1995 [JP] Japan .................................. 7-141663

[51] Int. Cl.$^6$ .............................. C09K 19/52; C09K 19/32; G02F 1/13
[52] U.S. Cl. ............... 252/299.01; 252/299.62; 349/93; 349/102; 349/183; 428/1
[58] Field of Search ................. 252/299.01, 299.62; 349/93, 102, 183; 428/1

[56] References Cited

U.S. PATENT DOCUMENTS 5,518,783   5/1996   Kawata et al. ............................ 428/1
5,635,105   6/1997   Kawata et al. ..................... 252/299.01

OTHER PUBLICATIONS

"Columnar Ordering of Liquid–Crystalline Discotics in Langmuir–Blodgett Films", Tsukruk et al; Langmuir, vol. 8, pp. 2279–2283, 1992.

Caplus 1989 : 174242, 1989.

*Primary Examiner*—Shean C. Wu
*Attorney, Agent, or Firm*—Burns, Doane, Swecker & Mathis, LLP

[57] ABSTRACT

Disclosed are a film composed of an oriented polymer matrix and a liquid crystalline compound contained therein. The oriented polymer matrix is generally formed by polymerization of a discotic compound having a polymerizable group and a liquid crystalline compound. Further, a process for preparation of the film and a liquid crystal display in which the film is employed as liquid crystal of a liquid crystal cell, are also disclosed.

9 Claims, 1 Drawing Sheet

FILM AND PROCESS FOR PREPARATION OF THE SAME AND LIQUID CRYSTAL DISPLAY

BACKGROUND OF THE INVENTION

1. Field of the Invention

The present invention relates to a film containing a liquid crystalline compound which can be particularly employed for a liquid crystal layer of liquid crystal cell, a process for preparation of the film, and the liquid crystal display having the film.

2. Description of Prior Art

As a display for electronic office system-devices such as a desk-top personal computer and a word processor, CRT (cathode ray tube) has been employed so far. Recently, a liquid crystal display (hereinafter referred to as LCD) is widely employed instead of the CRT because of its thin thickness, light weight and low power consumption. LCD generally has a structure comprising a liquid crystal cell that a layer of liquid crystal (e.g., twisted nematic liquid crystal or ferroelectric liquid crystal) is sealed between a pair of plates having electrode (e.g., ITO) and a pair of polarizing sheets disposed on both sides of the liquid crystal cell.

LCD using a twisted nematic liquid crystal for the Liquid crystal layer (i.e., TN-LCD), is widely employed. TN-LCD is usually designed to have high contrast by controlling back light irradiated behind LCD based on binary notation. Such a TN-LCD have a structure that liquid crystal is inserted in a gap between two orientation films (provided on a glass plate) for orienting the liquid crystal and utilizes orientation of liquid crystal to display an image. The layer of liquid crystal inserted in the gap is needed to have a small thickness having high precision in order to satisfy various optical characteristics (e.g., transparency, contrast). As materials forming the gap, a pair of glass plates and spacers for keeping the thickness of the gap are used.

Thus the preparation of the liquid crystal cell of TN-LCD needs a number of procedures, i.e., procedures such as formation of the orientation film and arrangement of the spacers, and therefore it is desired to reduce the number of these procedures.

Most of LCD such as TN-LCD use a glass plate as plate for the electrode plate because of their even surface, and therefore do not have a high resistance to impact. Hence, LCD is desired to have high resistance to impact (i.e., high flexibility), for example, by using no glass plate. Recently, it is suggested that plastic plate is employed instead of the glass plates. The use of plastic plates requires the number of spacers about 10 times that in the case of using the glass plate, to keep an even thickness of liquid crystal layer. Use of the excess spacers reduces the optical characteristics.

As LCD having no glass plate, back light and polarizing plate and needing no rubbing treatment in its production, reflective type LCD is already known. The reflective type LCD also enables a reduced power consumption, because it has no polarizing plate. Further, the LCD is designed on the basis of a principle of scattering and absorption observed in paper which is a preferable display medium for eyes of person. Such a LCD is, for example, prepared by using as a liquid crystal layer a polymer matrix film which is prepared by impregnating a porous resin sheet with a liquid crystalline compound (liquid crystal), or by dispersing a fine droplet or microcapsule of a liquid crystalline compound in a resin matrix. The LCD displays an image by utilizing light transmittance and scattering of liquid crystalline compound which is generated depending on whether electric field is applied or not. In other words, the LCD generally operates according to DS mode (Dynamic Scattering Mode).

As examples of the reflective type LCD, the following are known.

WO 83/01016 discloses LCD having a polymer matrix film containing a nematic liquid crystalline compound encapsulated with polyvinyl alcohol, and Japanese Patent Provisional Publication No. 60(1985)-252687 discloses LCD having polymer matrix film comprising a nematic liquid crystalline compound dispersed in various latexes.

Further, as examples of the reflective type LCD in which the polymer matrix film is composed of cured polymer, the following are known. WO 85/04262 discloses LCD having a polymer matrix film obtained by dispersing a liquid crystalline compound in epoxy resin and curing the epoxy resin, and Japanese Patent Provisional Publications No. 3(1991)58021 and No. 4(1992)-55815 LCD having a liquid crystal cell obtained by inserting a mixture a liquid crystalline compound and photopolymerizable monomer between a pair of glass plates having transparent electrode and curing the monomer to prepare a polymer matrix film.

SUMMARY OF THE INVENTION

If such a polymer matrix film containing a liquid crystalline compound is employed as liquid crystal layer of TN-LCD having polarizing plates and back light, TN-LCD is far easily prepared compared with in conventional process because use of an orientation film and spacers is not required. According to study of the inventor, however, in the case that a liquid crystal cell having the above polymer matrix film is incorporated into TN-LCD, an image displayed on the TN-LCD does not show a satisfactory contrast and is inferior in visibility to that obtained from TN-LCD using a liquid crystal layer disposed between a pair of glass plates through a number of spacers.

The further study of the inventor has revealed that use of an oriented polymer matrix resolves the above problems.

It is an object of the present invention to provide a film which can be particularly employed for a liquid crystal layer of liquid crystal cell.

It is another object of the invention to provide a film which is improved in contrast and can be particularly employed for a liquid crystal layer of TN-LCD.

It is a further object of the invention to provide a process for the preparation of the film.

It is a furthermore object of the invention to provide the liquid crystal display having the film.

There is provided by the invention a film which comprises an oriented polymer matrix (i.e., a polymer matrix in an orientation condition) and at least one liquid crystalline compound contained therein.

Preferred embodiments of the film of the invention are as follows:

1) The film wherein the oriented polymer matrix is formed by polymerization of at least one discotic compound having a polymerizable group.
2) The film described above 1) wherein the discotic compound has a liquid crystalline property.
3) The film wherein the liquid crystalline compound has no polymerizable group.
4) The film wherein the liquid crystalline compound is at least one compound selected from the group consisting of a smectic liquid crystalline compound, a nematic liquid crystalline compound, a cholesteric liquid crystalline compound, a chiral nematic liquid crystalline compound, a ferroelectric liquid crystalline compound and a diaferroelectric liquid crystalline compound.

5) The film wherein the oriented polymer matrix has optically anisotropic property.

6) The film described above 1) wherein the discotic compound has one chemical structure in the molecule selected from the group consisting of the following structures (1) to (6):

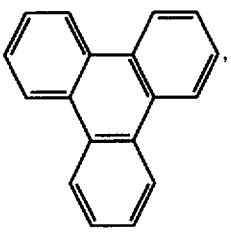
(1)

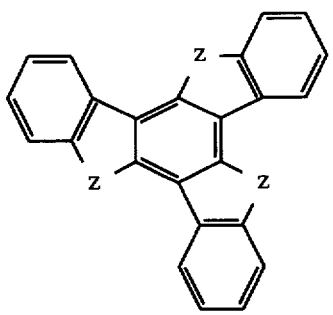
(2)

wherein Z represents —CH$_2$—, —O—, —S— or —NR$^1$— in which R$^1$ stands for alkyl of 1 to 5 carbon atoms,

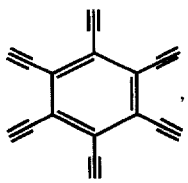
(3)

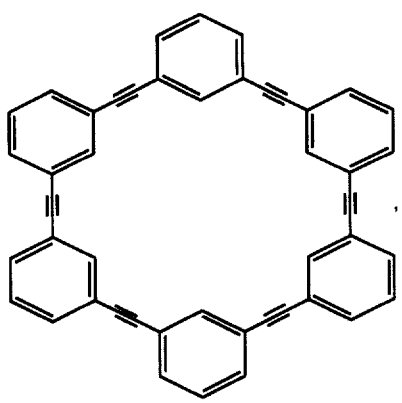
(4)

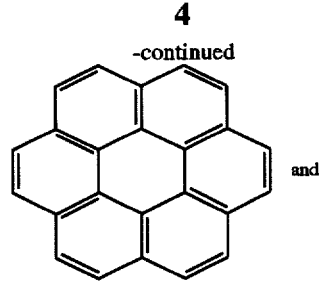
and
(5)

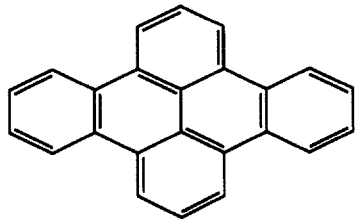
(6)

7) The film wherein the oriented polymer matrix has a three-dimensional structure.

The film can be advantageously prepared by the process which comprises the steps of:

forming a layer comprising a mixture of at least one discotic compound having a polymerizable group and at least one liquid crystalline compound, heating the layer of the mixture to orient the discotic compound, and applying light or heat energy to the oriented discotic compound to polymerize; or by the process which comprises the steps of:

forming on an orientation film a layer comprising a mixture of at least one discotic compound having a polymerizable group and at least one liquid crystalline compound, heating the layer of the mixture to orient the discotic compound, and applying light or heat energy to the oriented discotic compound to polymerize whereby a polymerized discotic compound layer containing liquid crystalline compound is formed, and separating the polymerized discotic compound layer from the orientation film.

There is also provided by the invention a liquid crystal display comprising a liquid crystal cell which comprises a pair of substrates provided with a transparent electrode and the film described above disposed therebetween.

In the liquid crystal display, a pair of polarizing sheets is preferably arranged on both sides of the cell.

The film of the invention is composed of an oriented polymer matrix (preferably formed by polymerization of a discotic compound having a polymerizable group) and a liquid crystalline compound contained therein. In the film, the polymer of matrix is oriented parallel or at certain angle to the surface of the matrix, and therefore the liquid crystalline compound contained in the matrix is easily oriented along the polymer. Hence, when the film is employed as liquid crystal of a liquid crystal cell of LCD, the resultant LCD is free from use of an orientation film. Further, the film is prepared in even thickness and therefore its use needs no spacers. Moreover the displayed image is improved in contrast compared with use of the known polymer matrix containing liquid crystal.

In more detail, the liquid crystalline compound contained in the oriented polymer matrix of the invention can be easily oriented because the matrix functions as three-dimensional orientation film (i.e., layer having orientation function in not only plane directions but also thickness direction), and therefore light incident upon the film can be efficiently pass through or cut off. Hence, LCD having the film is extremely improved in contrast of displayed image.

The orientation film is generally formed by subjecting to heat treatment, and therefore use of the film of the invention enables use of plastic material as the plate for electrode plate instead of glass having high heat resistance.

DETAILED DESCRIPTION OF THE INVENTION

Figure 1:
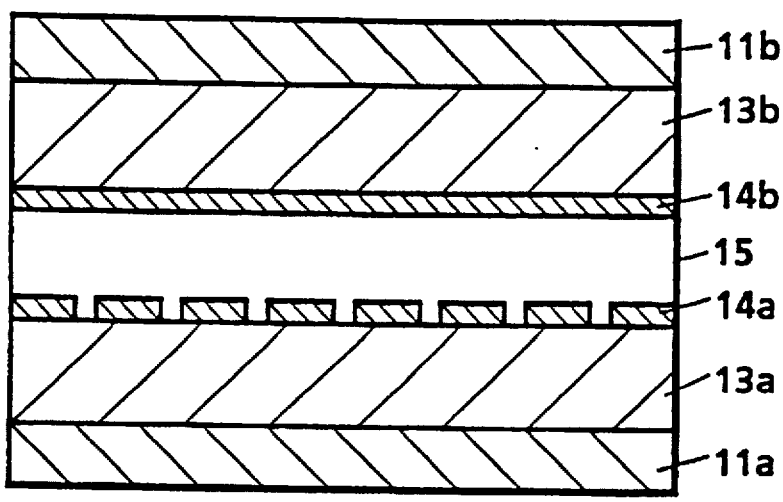
FIG. 1 is a view schematically showing the representative structure of the liquid crystal display of the invention.

The film of the invention comprises an oriented polymer matrix and at least one liquid crystalline compound contained therein. The polymer matrix is generally formed by polymerization of a compound having a polymerizable group. The compound having a polymerizable group (preferably discotic compound) generally has liquid crystalline property, and the resulting polymer matrix is in an orientation condition (generally has optically anisotropic property) and has function imparting orientation property to the liquid crystalline compound. As the liquid crystalline compound contained in the polymer matrix, any compound can be employed so long as the compound has liquid crystalline property.

The polymer matrix of the invention is in the orientation condition. Such an oriented polymer matrix is formed, for example, by orienting a layer of discotic compound having polymerizable group and polymerizing the layer; or orienting a layer of liquid crystalline compound having polymerizable group and polymerizing (curing) the layer; or orienting a layer of liquid crystalline polymer.

In the oriented polymer matrix prepared by polymerization of the discotic compound, for instance, the discotic plane of the polymer matrix is oriented, and the liquid crystalline compound contained in the matrix is oriented along the discotic plane. The liquid crystalline compound can be present in the polymer matrix in the form of a molecule or fine droplet (particle) consisting of a number of molecules. The liquid crystalline compound is under the influence of orientation force defined by discotic plane which is present throughout the matrix, and therefore the liquid crystalline compound can be easily and stably oriented along the discotic plane, compared with the conventional liquid crystalline compound under the influence of orientation force of only two (a pair of) orientation films.

The orientation condition of the liquid crystalline compound generally corresponds to the arrangement in application of no voltage, in TN-LCD mode. Since the liquid crystalline compound can be easily oriented as above, light incident upon the film is efficiently passed through the film. Hence, LCD having the film is extremely improved in contrast of displayed image.

The discotic compounds employed in the invention include those having liquid crystalline property and those having no liquid crystalline property. However, it is difficult to classify these discotic compounds from the viewpoint of structure.

Examples of the discotic compounds having liquid crystalline property include benzene, triphenylene derivatives and phthalocyanine derivatives described in C. Destrade et al., Mol. Cryst. vol. 71, pp. 111, 1981, truxene derivatives described in C. Destrade et al., Mol Cryst. vol. 122, pp. 141, 1985, Physics lett. A, vol. 78, pp. 82, 1980, cyclohexane derivatives described in B. Kohn et al., Angew. Chem. vol. 96, pp. 70, 1984, and macrocyclic compounds of azacrown-type or phenylacetylene-type described in J. M. Lehn et al., J. Chem. Commun. pp. 1794, 1985, and J. Zhang et al., J. Am. Chem. Soc. vol. 116, pp. 2655, 1994. The discotic liquid crystalline compound generally has a structure that the basic skeleton of above compound is located at a center of a molecule as a parent core and further straight chain groups such as alkyl, alkoxy and benzoyl having a substituent are radially bonded to the skeleton. Further, discotic liquid crystalline compounds of organometallic complex are described in Chemistry of Liquid Crystal, Elements of Chemistry, vol. 22, pp. 135, 1994, The Chemical Society of Japan. These discotic liquid crystalline compounds have a structure that a metal atom in the center of a molecule is surrounded on the same plane by its ligands, and hence the compounds are considered to have discotic liquid crystalline property.

Examples of the discotic compounds having no liquid crystalline property include compounds having π-electron conjugated system described in The Chemical Society of Japan, 69th Spring, Preliminary lecture drafts II, 3A111, 3A112, 3A113 and 3A114; and cyclophane molecules or calix arene described in above-mentioned Preliminary lecture drafts II, 1G241, 1G242 and 1G243.

The discotic compound has at least one group polymerizable by application of light or heat energy. The polymerizable group is one that reacts with the same kind of group to form a new bonding, or one that reacts with other group to form a new bonding. Examples of the groups are described in "Organic Functional Group Preparations, S. R. Sandler, W. Karo, Vol. 1 and Vol. 2, Academic Press, New York, London, 1968". Preferred are polymerizable groups such as a group having double or triple bond (e.g., double or triple bond consisting of carbon atoms) and groups of heterocyclic rings such as oxiranyl and aziridinyl. Especially, preferred are double bonds such as an acryloyl group and a vinylether group, and an oxiranyl group (epoxy group), which are described in "Macromolecules, R. A. M. Hikmet, vol. 25, pp. 4194, 1992", "Polymer, R. A. M. Hikmet, vol. 34, 8, pp. 1763, 1993" and "Macromolecules, D. J. Broer, vol. 26, pp. 1244, 1993".

The discotic compound generally has one structure in the molecule selected from the following structures (1) to (6):

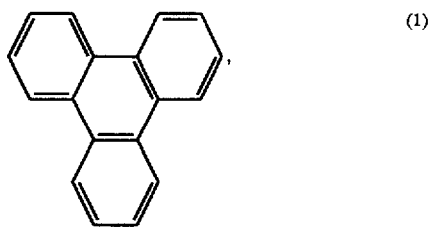
(1)

-continued (2)
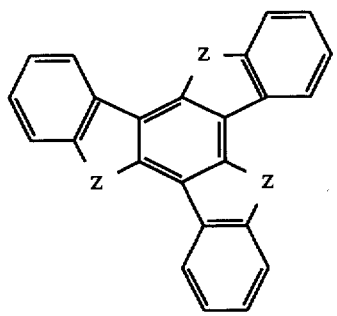

wherein Z represents —CH₂—, —O—, —S— or —NR¹— in which R¹ stands for alkyl of 1 to 5 carbon atoms, (3)
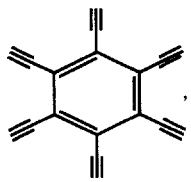

(4)
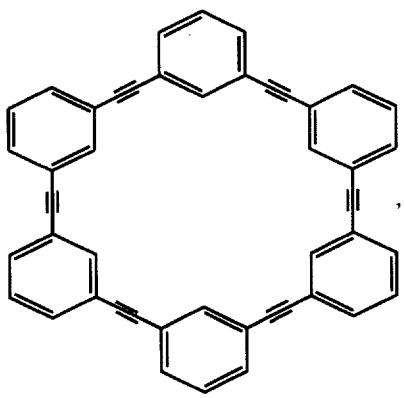

(5)
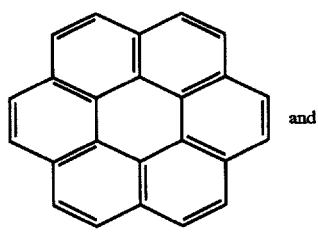

and (6)
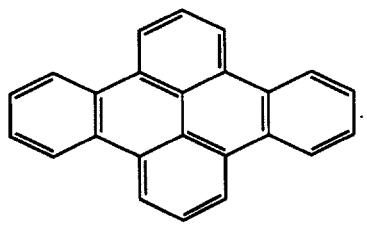

Examples of the discotic compounds are described below.

Formula (A):

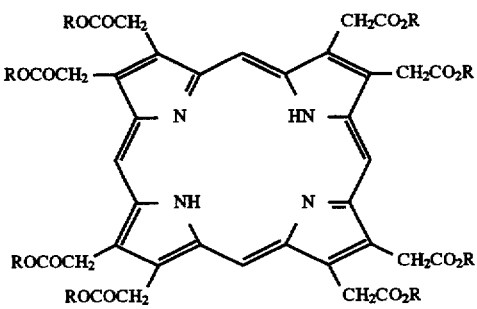

Examples of R of the formula (A), are as follows:

| | |
|---|---|
| —C₂H₄OCOCH═CH₂ | A-1 |
| —C₄H₈OCOCH═CH₂ | A-2 |
| —C₆H₁₂OCOCH═CH₂ | A-3 |
| —C₉H₁₈OCOCH═CH₂ | A-4 |
| —C₂H₄OC≡CH | A-5 |
| —C₄H₈OCH₂C≡CH | A-6 |
| —C₆H₁₂OCH═CH₂ | A-7 |
| —C₉H₁₈OCH═CH₂ | A-8 |
| —C₂H₄OCH₂CH₂NH₂ | A-9 |
| —C₄H₈SO₃H | A-10 |
| —C₆H₁₂OCH₂CH—CH₂ (epoxide) | A-11 |
| —C₉H₁₈OCH₂CH—CH₂ (epoxide) | A-12 |

Formula (B):

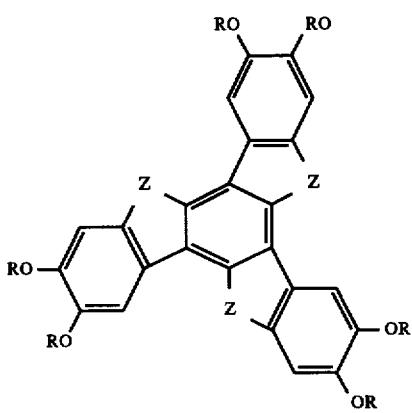

Examples of R and Z of the formula (B), are as follows:

| R | Z | |
|---|---|---|
| —C₂H₄OCOC(CH₃)=CH₂ | —CH₂— | B-1 |
| —C₄H₈OCOCH=CH₂ | —O— | B-2 |
| —C₆H₁₂OCOCH=CH₂ | —S— | B-3 |
| —C₉H₁₈OCOCH=CHCH₃ | —S— | B-4 |
| —C₂H₄OCH=CH₂ | —CH₂— | B-5 |
| —C₄H₈OCH=CH₂ | —O— | B-6 |
| —C₆H₁₂OCONHC₂H₄NCS | —CH₂— | B-7 |
| —C₉H₁₈OCH=CH₂ | —S— | B-8 |
| —C₂H₄SC₂H₄SH | —O— | B-5 |
| —C₄H₈CHO | —CH₂— | B-10 |
| —C₆H₁₂OCH₂CH(—O—)CH₂ | —CH₂— | B-11 |
| —C₉H₁₈OCH₂CH(—O—)CH₂ | —O— | B-12 |

Formula (C):

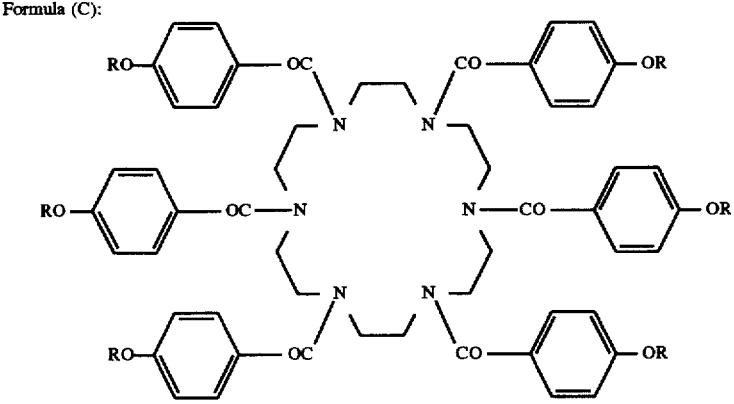

Examples of R of the formula (C), are as follows:

| | |
|---|---|
| —C₂H₄OCOCH=CH₂ | C-1 |
| —C₄H₈OCOCH=CH₂ | C-2 |
| —C₆H₁₂OCOCH=CH₂ | C-3 |
| —C₉H₁₈OH | C-4 |
| —C₂H₄OCH=CH₂ | C-5 |
| —C₄H₈CO₂H | C-6 |

-continued

| | |
|---|---|
| $-C_6H_{12}OCH=CH_2$ | C-7 |
| $-C_9H_{18}OCH=CH_2$ | C-8 |
| $-C_2H_4OCH_2CH\underset{O}{—\!\!\triangle\!\!—}CH_2$ | C-9 |
| $-C_4H_8OCH_2CH\underset{O}{—\!\!\triangle\!\!—}CH_2$ | C-10 |
| $-C_6H_{12}OCH_2C\equiv CH$ | C-11 |
| $-C_9H_{18}OCH_2CH\underset{O}{—\!\!\triangle\!\!—}CH_2$ | C-12 |

Further, examples of the formula (C), are as follows:

Examples of R of the formula (D), are as follows:

| | |
|---|---|
| $-C_4H_8OCOCH=CH_2$ | D-1 |
| $-C_6H_{12}OCOCH=CH_2$ | D-2 |
| $-C_9H_{18}OCOCH=CH_2$ | D-3 |
| $-C_2H_4OCH=CH_2$ | D-4 |
| $-C_6H_{12}OCH=CH_2$ | D-5 |
| $-C_9H_{18}OCH=CH_2$ | D-6 |
| $-C_2H_4OCH_2CH\underset{O}{—\!\!\triangle\!\!—}CH_2$ | D-7 |
| $-C_4H_8OCH_2CH\underset{O}{—\!\!\triangle\!\!—}CH_2$ | D-8 |

C-13

C-14

Formula (D):

-continued
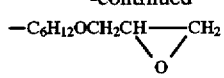 D-9
Further, an example of the formula (D), is as follows:
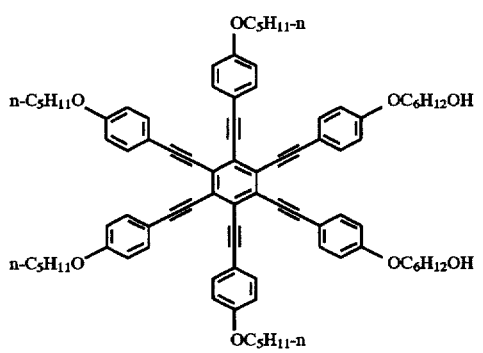
Formula (E):
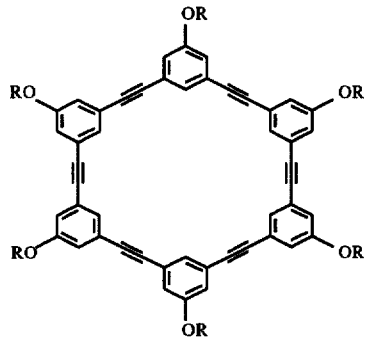
Examples of R of the formula (E), are as follows:
 E-1
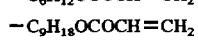 E-2
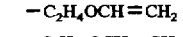 E-3
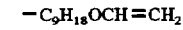 E-4
 E-5
$-C_9H_{18}OCH=CH_2$ E-6
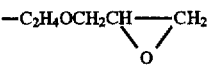 E-7
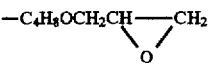 E-8
$-C_6H_{12}OCH_2CH\underset{O}{\overset{}{\diagdown\!\!\!\diagup}}CH_2$ E-9
Further, an example of the formula (E), is as follows:
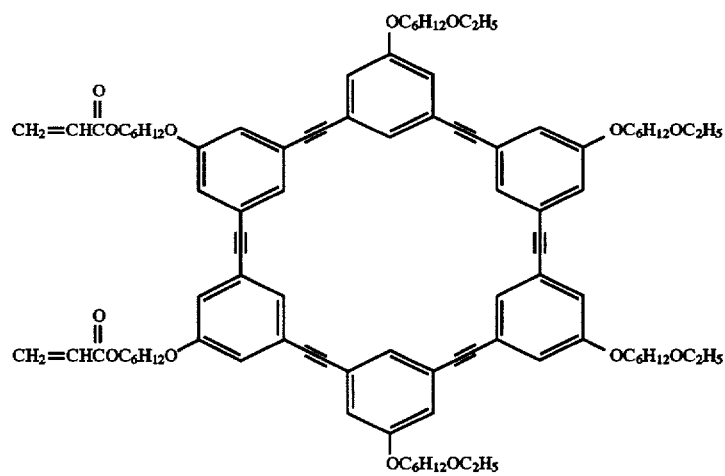

Formula (F):

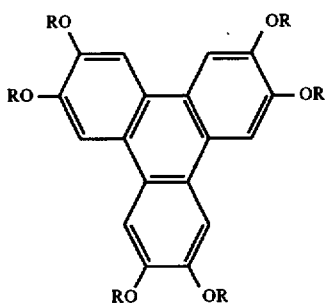

Examples of R of the formula (F), are as follows:

| | |
|---|---|
| $-C_2H_4OCOCH=CH_2$ | F-1 |
| $-C_4H_8OCOCH=CH_2$ | F-2 |
| $-C_6H_{12}OCOCH=CH_2$ | F-3 |
| $-C_9H_{18}OH$ | F-4 |
| $-C_2H_4OCH=CH_2$ | F-5 |
| $-C_4H_8CO_2H$ | F-6 |
| $-C_6H_{12}OCH=CH_2$ | F-7 |
| $-C_9H_{18}OCH=CH_2$ | F-8 |

 F-9

 F-10

$-C_6H_{12}OCH_2C\equiv CH$    F-11

 F-12

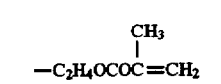 F-13

| | |
|---|---|
| $-C_4H_8OCOCH=CH_2$ | F-14 |
| $-C_6H_{12}OCOCH=CH_2$ | F-15 |
| $-C_9H_{18}OCOCH=CHCH_3$ | F-16 |
| $-C_2H_4OCH=CH_2$ | F-17 |
| $-C_4H_8OCH=CH_2$ | F-18 |
| $-C_6H_{12}OCONHC_2H_4NCS$ | F-19 |
| $-C_9H_{18}OCH=CH_2$ | F-20 |
| $-C_2H_4SC_2H_4SH$ | F-21 |
| $-C_4H_8CHO$ | F-22 |

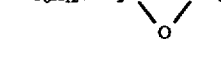 F-23

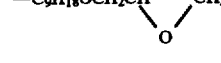 F-24

Formula (G):

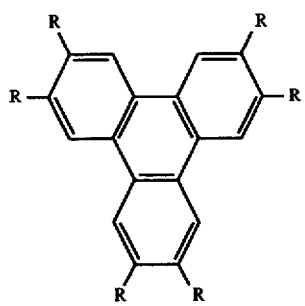

Examples of R of the formula (G), are as follows:

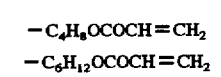 G-1

| | |
|---|---|
| $-OC_5H_{10}OCOCH=CH_2$ | G-2 |
| $-NHC_6H_{12}OCOCH=CH_2$ | G-3 |
| $-OC_8H_{16}OCOCH=CHCH_3$ | G-4 |
| $-NHC_2H_4OCH=CH_2$ | G-5 |
| $-OC_3H_6OCH=CH_2$ | G-6 |
| $-OC_6H_{12}OCONHC_2H_4NCO$ | G-7 |

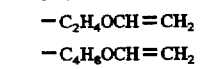 G-8

| | |
|---|---|
| $-SC_2H_4SC_2H_4SH$ | G-9 |
| $-SC_4H_8CHO$ | G-10 |

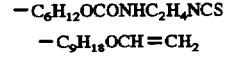 G-11

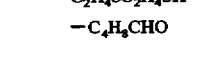 G-12

The discotic compounds are preferably capable of forming discotic liquid crystalline phase. Although the discotic liquid crystalline compounds generally show columnar phase, discotic nematic phase or chiral discotic nematic phase, the discotic liquid crystalline compounds showing discotic nematic phase are preferred because they easily show mono-domain of the phase in relative large area.

Preferred examples of the discotic compounds are described below.

Formula (G):
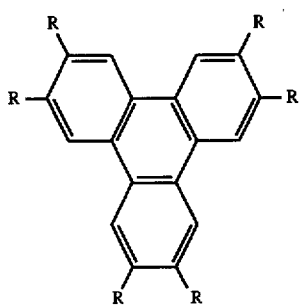
Examples of R of the formula (G), are as follows:
G-13
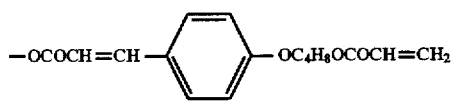
G-14
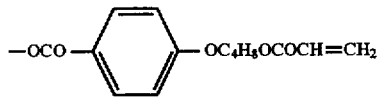
G-15
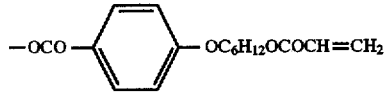
G-16
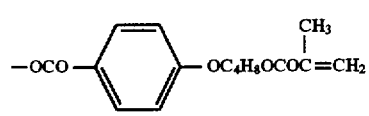
G-17
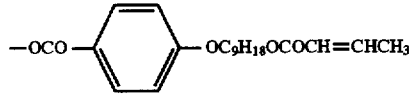
G-18
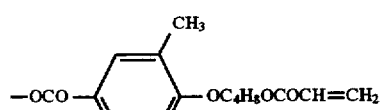
G-19
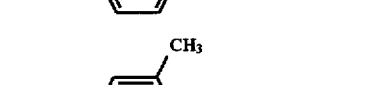
G-20
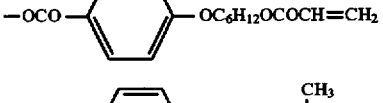
G-21
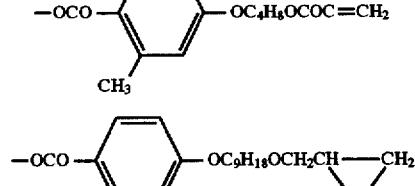
G-22
-continued
G-23
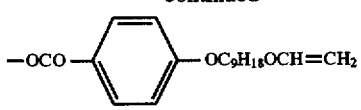
G-24
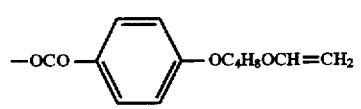
Formula (H):
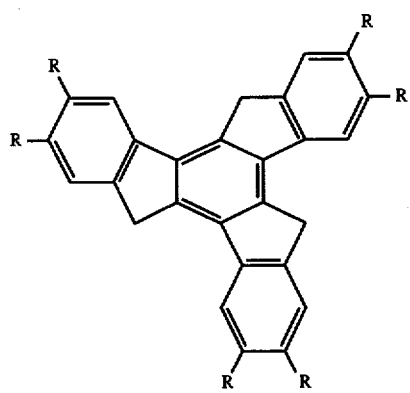
Examples of R of the formula (H), are as follows:
H-1
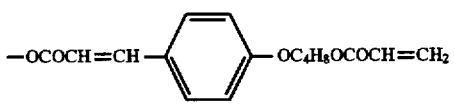
H-2
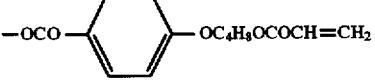
H-3
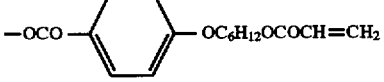
H-4
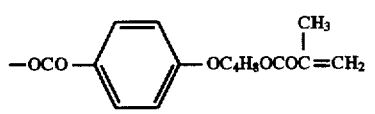
H-5
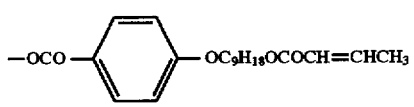
H-6
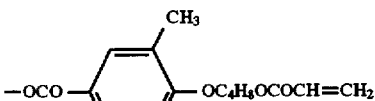
H-7
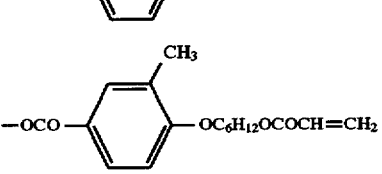

-continued
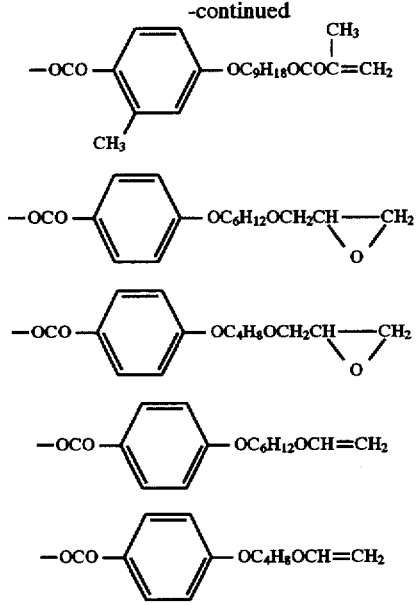
H-8
H-9
H-10
H-11
H-12
Formula (J):
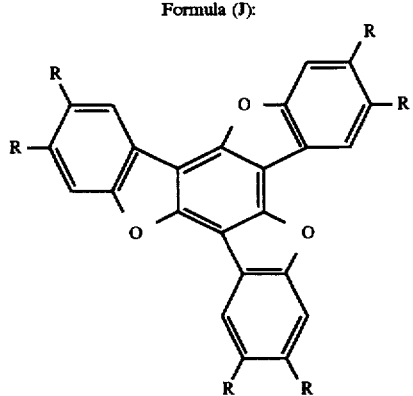
Examples of R of the formula (J), are as follows:
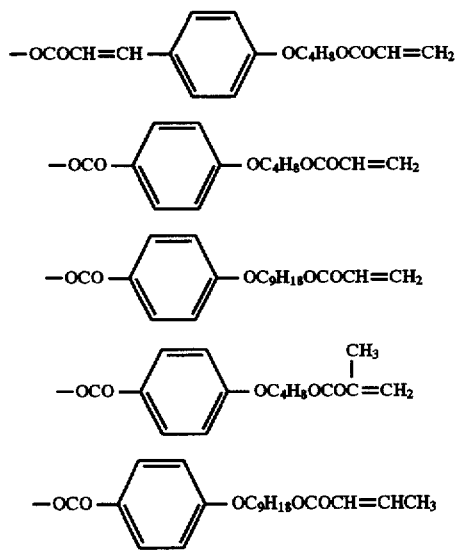
J-1
J-2
J-3
J-4
J-5
-continued
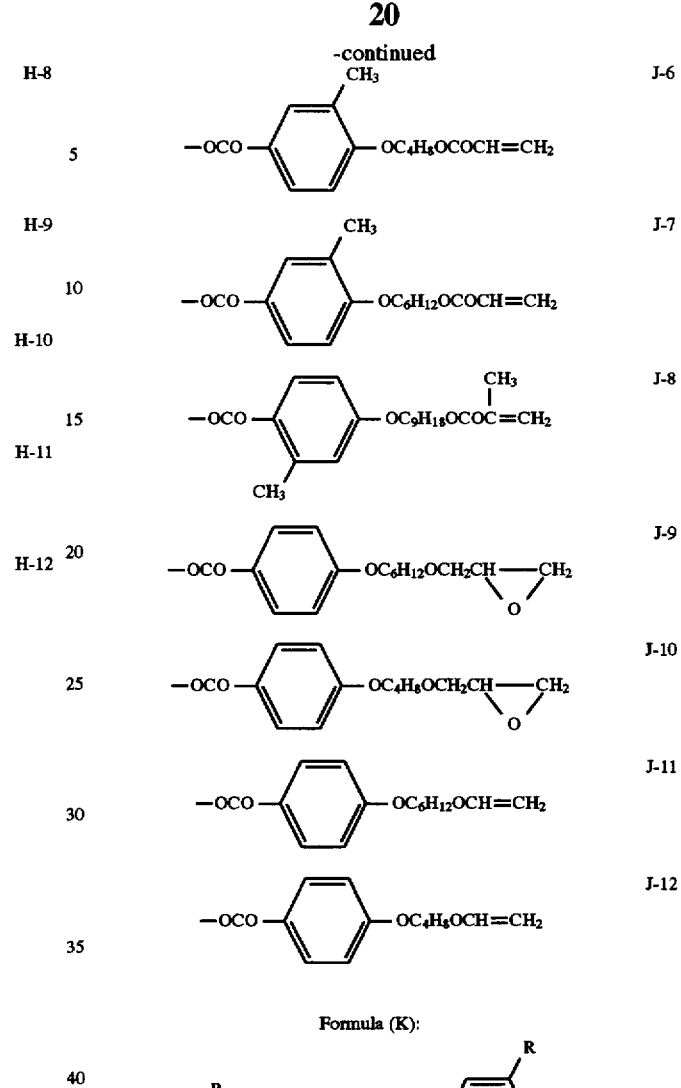
J-6
J-7
J-8
J-9
J-10
J-11
J-12
Formula (K):
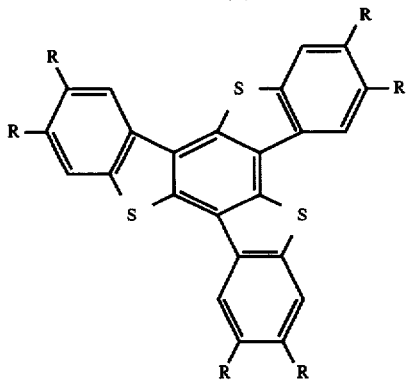
Examples of R of the formula (K), are as follows:
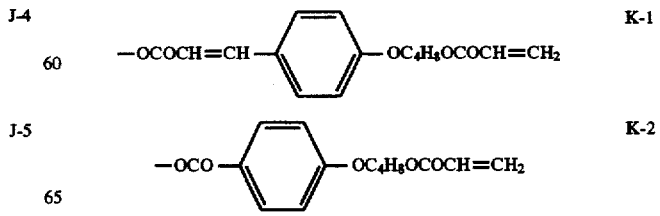
K-1
K-2

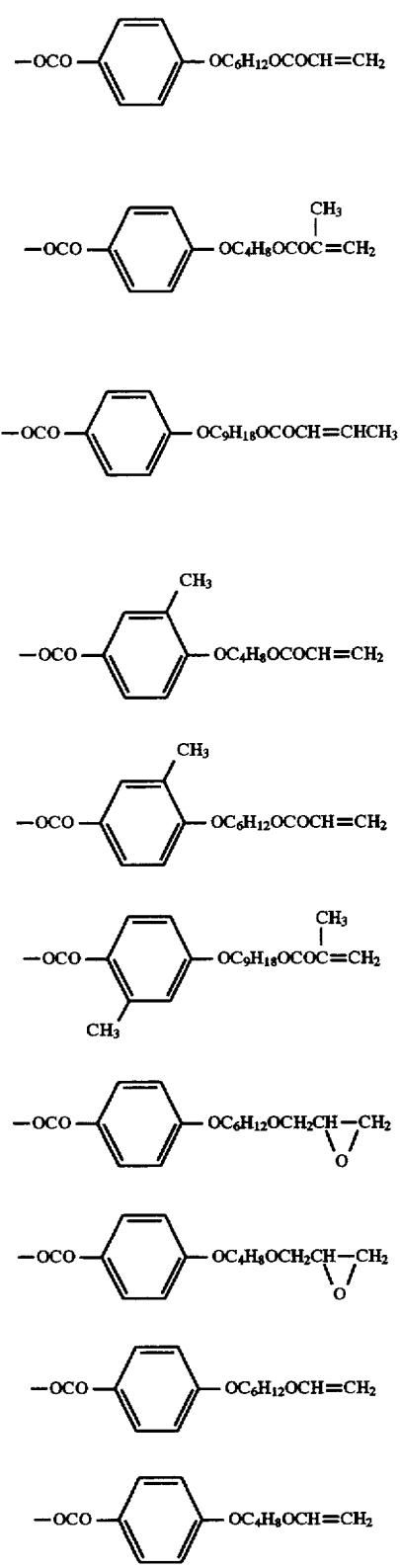
K-3
K-4
K-5
K-6
K-7
K-8
K-9
K-10
K-11
K-12
Formula (L):
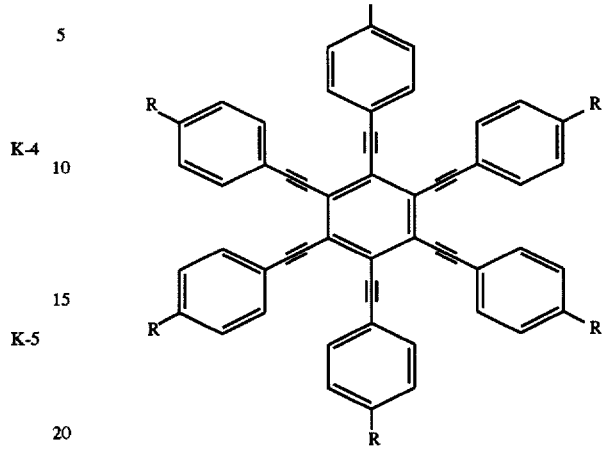
Examples of R of the formula (L), are as follows:
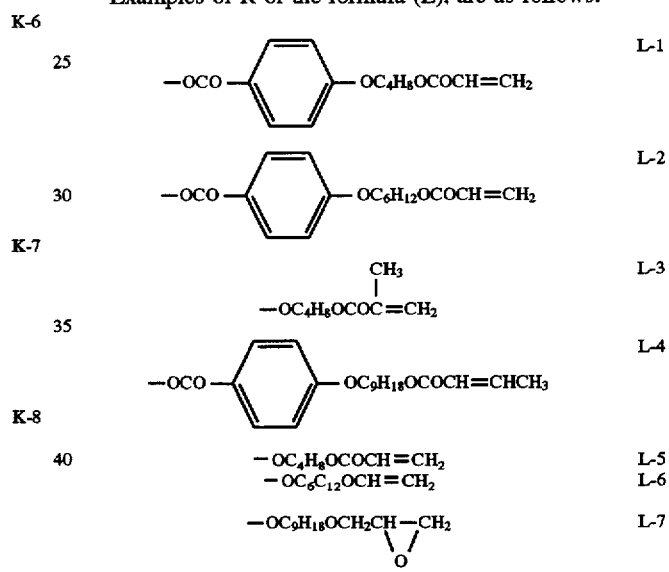
Formula (M):
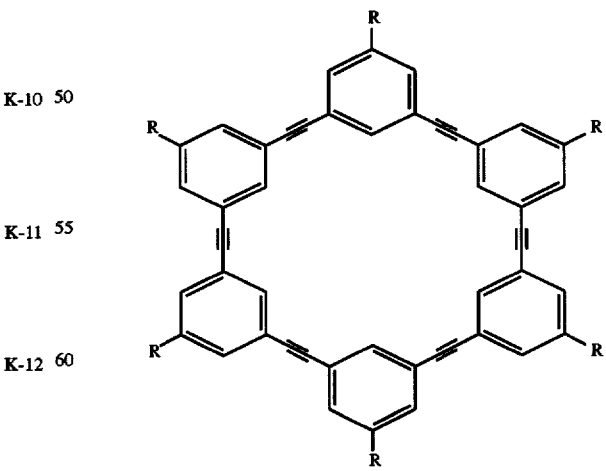

Examples of R of the formula (M), are as follows:

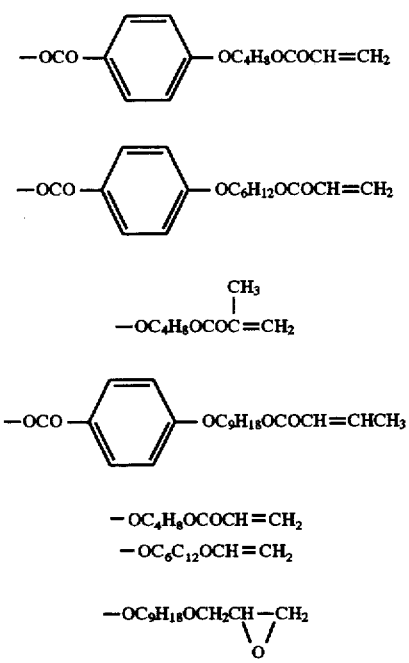

- M-1
- M-2
- M-3
- M-4
- −OC$_4$H$_8$OCOCH=CH$_2$  M-5
- −OC$_6$C$_{12}$OCH=CH$_2$  M-6
- −OC$_9$H$_{18}$OCH$_2$CH—CH$_2$ (epoxide)  M-7

Formula (N):

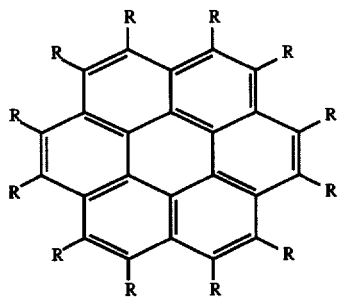

Examples of R of the formula (N), are as follows:

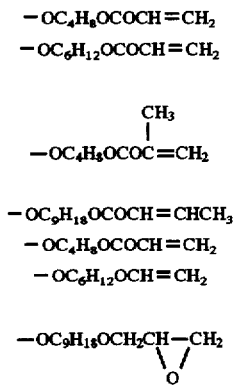

- −OC$_4$H$_8$OCOCH=CH$_2$  N-1
- −OC$_6$H$_{12}$OCOCH=CH$_2$  N-2
- −OC$_4$H$_8$OCOC(CH$_3$)=CH$_2$  N-3
- −OC$_9$H$_{18}$OCOCH=CHCH$_3$  N-4
- −OC$_4$H$_8$OCOCH=CH$_2$  N-5
- −OC$_6$H$_{12}$OCH=CH$_2$  N-6
- −OC$_9$H$_{18}$OCH$_2$CH—CH$_2$ (epoxide)  N-7

Formula (O):

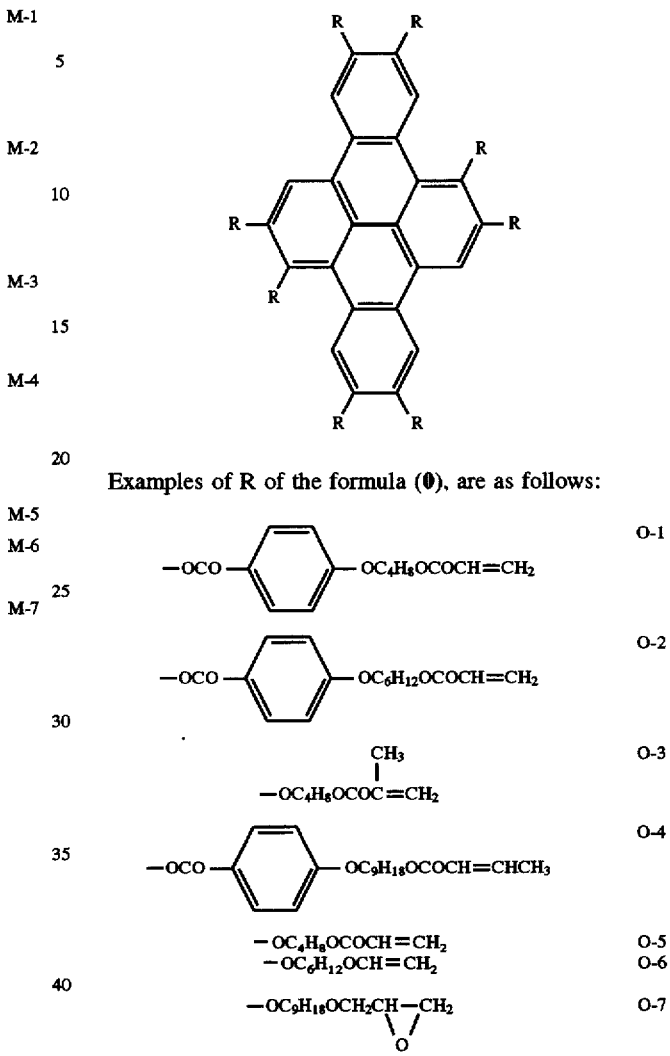

Examples of R of the formula (O), are as follows:

- O-1: −OCO−⟨C$_6$H$_4$⟩−OC$_4$H$_8$OCOCH=CH$_2$
- O-2: −OCO−⟨C$_6$H$_4$⟩−OC$_6$H$_{12}$OCOCH=CH$_2$
- O-3: −OC$_4$H$_8$OCOC(CH$_3$)=CH$_2$
- O-4: −OCO−⟨C$_6$H$_4$⟩−OC$_9$H$_{18}$OCOCH=CHCH$_3$
- O-5: −OC$_4$H$_8$OCOCH=CH$_2$
- O-6: −OC$_6$H$_{12}$OCH=CH$_2$
- O-7: −OC$_9$H$_{18}$OCH$_2$CH—CH$_2$ (epoxide)

The film having liquid crystalline property of the invention is preferably prepared by forming a layer comprising a mixture of the discotic compound having a polymerizable group and the liquid crystalline compound, and heating the layer to orient the discotic compound, and then applying light or heat energy to the layer of mixture to polymerize the discotic compound. The liquid crystalline compound is contained as a low molecular compound in an oriented polymer matrix which is formed by polymerization of the above discotic compound. Therefore the liquid crystalline compound should be not polymerized during polymerization of the above discotic compound.

The liquid crystalline compound generally has no polymerizable group. However, the liquid crystalline compound may have a polymerizable group which is not polymerized during polymerization of the discotic compound, e.g., the case that the liquid crystalline has triple bond (e.g., ethynyl group) as a polymerizable group while the discotic compound has double bond (e.g., acryloyl group).

Examples of the liquid crystalline compound include a smectic liquid crystalline compound, a nematic liquid crystalline compound, a cholesteric liquid crystalline compound, a chiral nematic liquid crystalline compound, a ferroelectric liquid crystalline compound and a diaferroelectric liquid crystalline compound, which are described in Chemistry of Liquid Crystal, Elements of Chemistry, vol. 22, pp. 40, 1994, The Chemical Society of Japan. The examples also include the products (mixture of liquid crystalline compounds) which are commercially available as trade names of E-8, ZLI-4788, ZLI-1800-100 and EN-35 (produced by Merck & Co., Inc.).

Examples of the liquid crystalline compounds are as follows:

Formula (P):

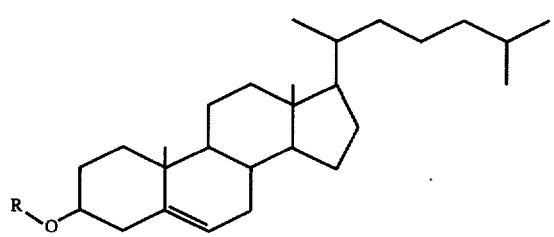

Examples of R of the formula (P), are as follows:

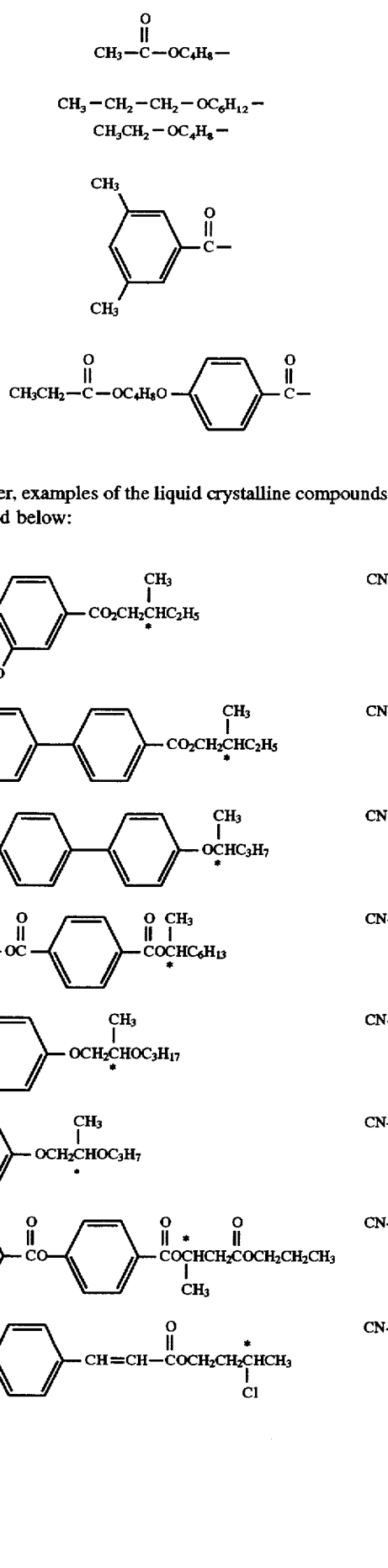

Further, examples of the liquid crystalline compounds are described below:

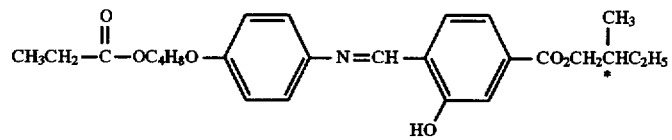

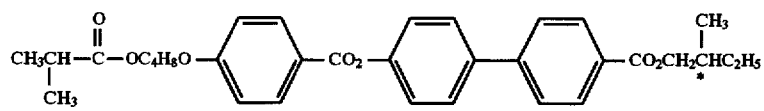

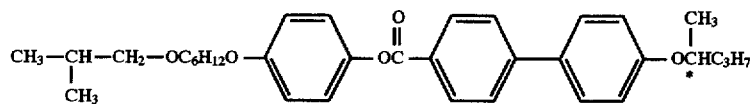

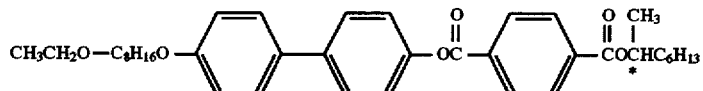

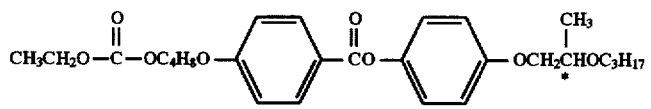

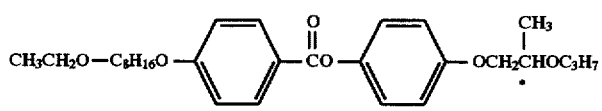

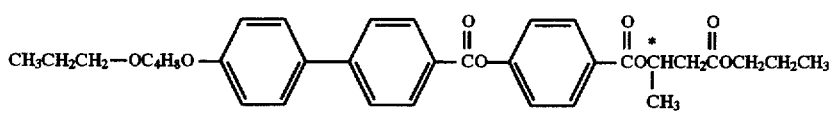

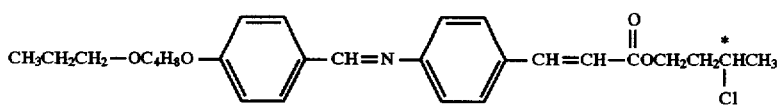

-continued
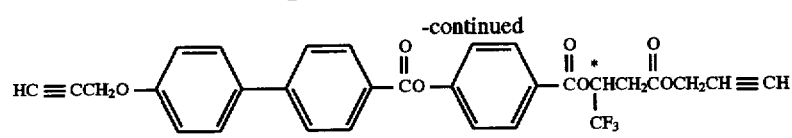 CN-9
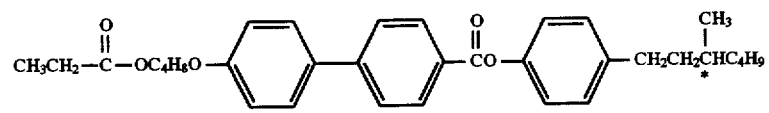 CN-10
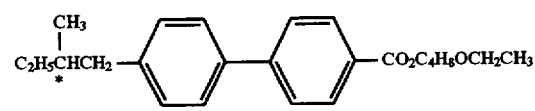 CN-11
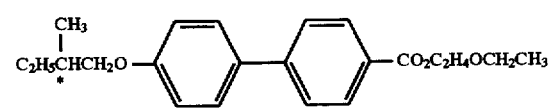 CN-12
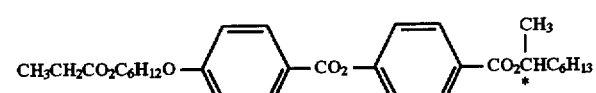 CN-13
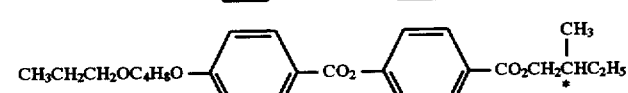 CN-14
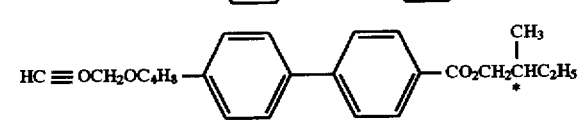 CN-15
 CN-16
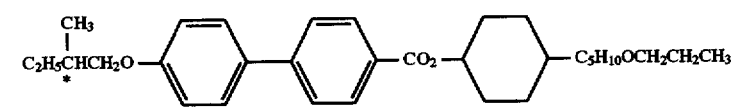 CN-17
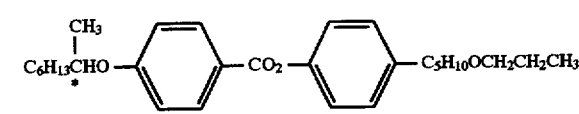 CN-18
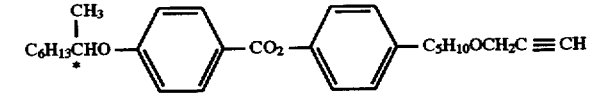 CN-19
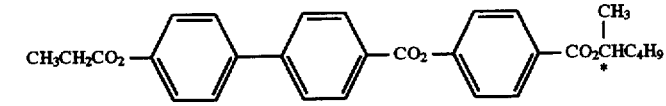 CN-20
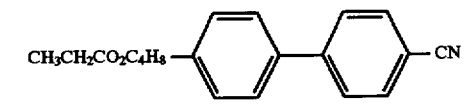 CN-21
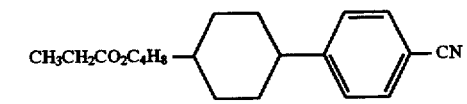 CN-22
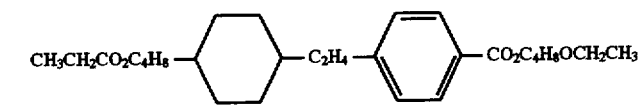 CN-23

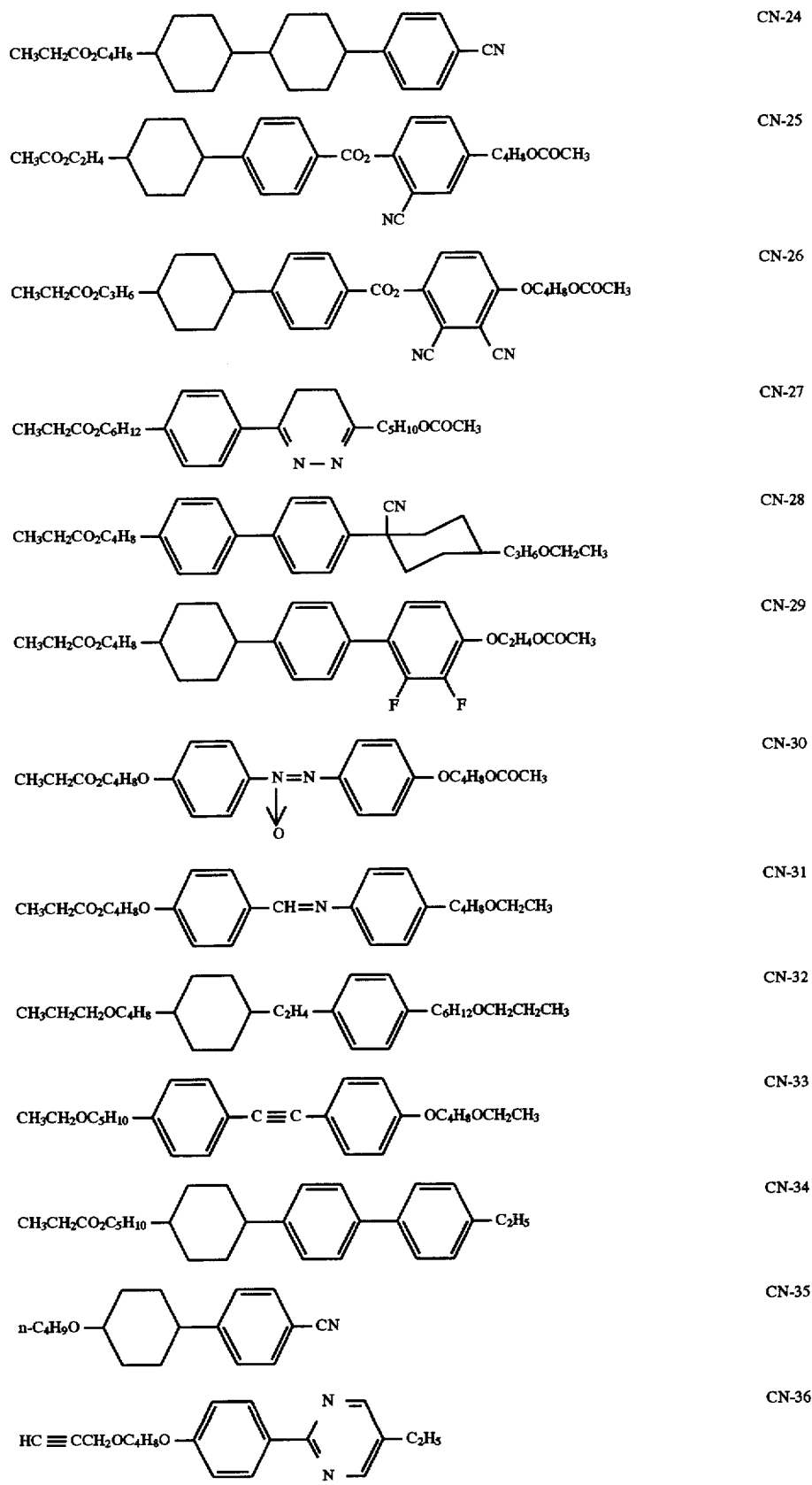

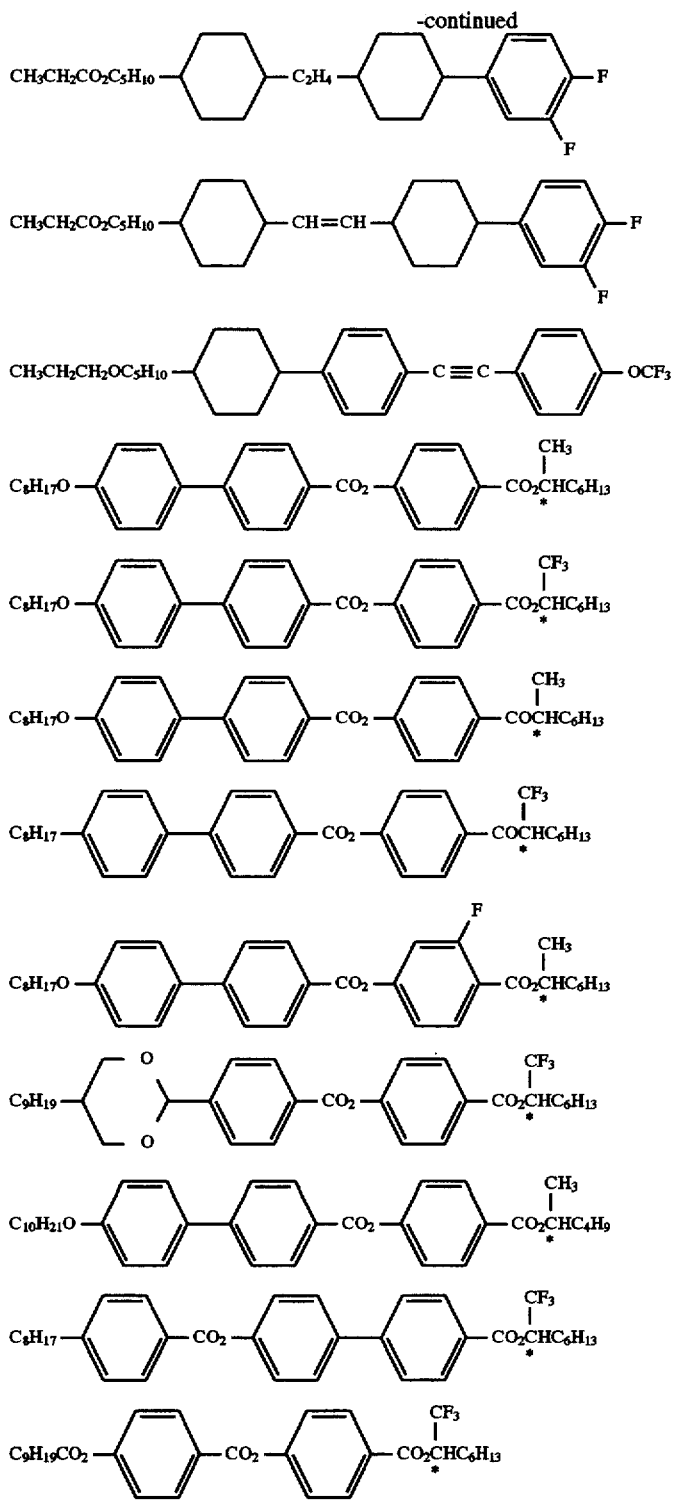

The ratio of the liquid crystalline compound and the oriented polymer matrix generally is in the range of 5:95 to 75:25 (liquid crystalline compound:polymer matrix), by weight, preferably 5:95 to 50:50, and especially 5:95 to 30:70.

The mixture (e.g., the discotic compound and the liquid crystalline compound) for forming the film of the invention may contain various compounds such as polymer (e.g., liquid crystalline polymer, nonliquid-crystalline polymer), monomer having a polymerizable group, ultraviolet curable resin and surface active agent.

Examples of the polymers include nonliquid-crystalline polymers such as polymethyl metacrylate, acrylic acid/methacrylic acid copolymer, styrene/maleinimide copolymer, polyvinyl alcohol, poly(N-methylolacrylamide), styrene/vinyltoluene copolymer, chlorosulfonated polyethylene, nitrocellulose, polyvinyl chloride, chlorinated polyolefin, polyester, polyimide, vinyl acetate/vinyl chloride copolymer, ethylene/vinyl acetate copolymer, polyethylene, polypropylene, polycarbonate and silicone resin; and known various liquid crystalline polymers.

Examples of the monomer having a polymerizable group are described below:

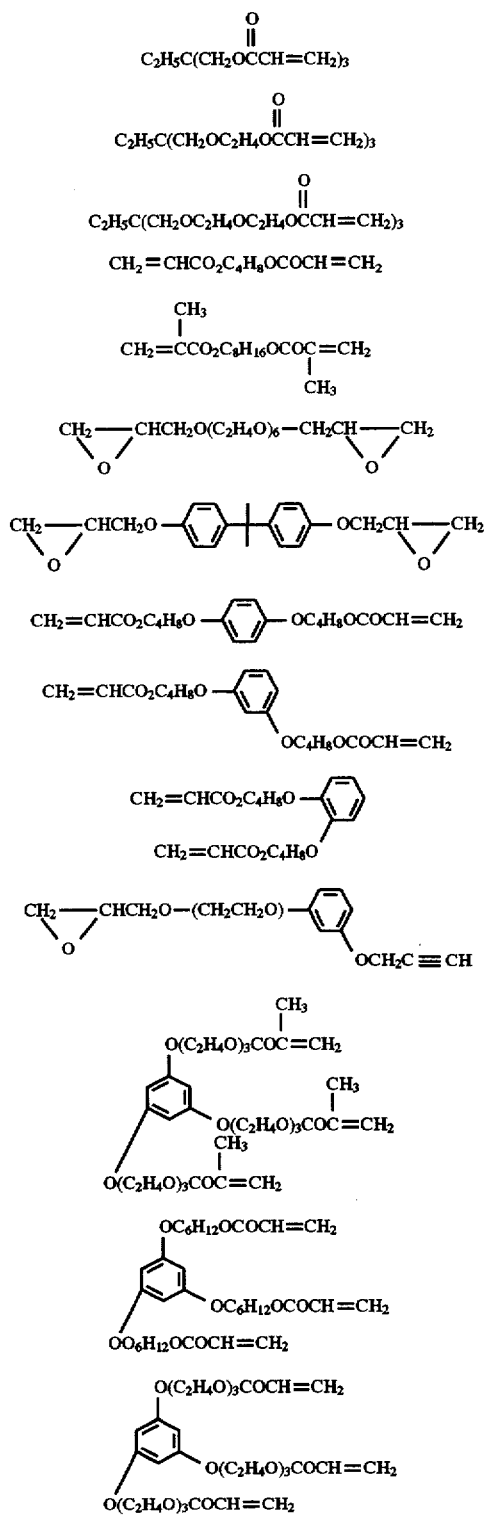

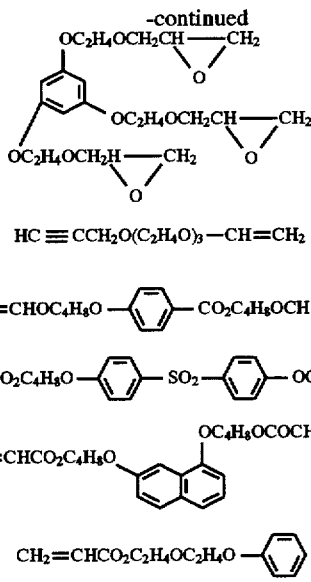

Examples of the surface active agents include cationic, anionic and nonionic surface active agents.

Subsequently, the process for the preparation of the film of the invention is explained. The process is, for example, performed as follows:

The discotic compound having a polymerizable group and the liquid crystalline compound are mixed to form a mixture, and if desired, the above-mentioned other compounds such as polymer and monomer are added to the mixture. The resultant mixture is coated on a support or an orientation film provided thereon by means of coating method (e.g., spin coating method, dip coating method, roll coating method and extrusion method); or is deposited on a support or an orientation film provided thereon by means of vapor deposit; to form a thin layer (its thickness preferably is in the range of 0.1 to 10 μm). Subsequently the thin layer is heated to orient the discotic compound (preferably a temperature for forming liquid crystalline phase such as discotic nematic phase), and then heat energy or light is applied to the thin layer to polymerize the discotic compound in the thin layer, whereby a film (comprising the oriented polymer matrix and the liquid crystalline compound therein) can be obtained. In the case that the thin layer of mixture is formed by coating method, the mixture may contain appropriate solvent. In this process, in place of the discotic compound having a polymerizable group, a liquid crystalline compound having a polymerizable group other than the discotic compound may be employed.

The formation of the film is preferably performed by the steps of: coating the mixture on the orientation film by means of coating method, drying the coated layer, heating the coated layer at a temperature for forming the discotic nematic phase or monoaxial columnar phase to form a layer in the condition of one of the phases, irradiating light on the layer or applying heat to the layer to polymerize (cure) the layer, and cooling the polymerized layer. Subsequently the resultant polymerized layer is peeled from the orientation film of the support to obtain a film. The film shows optically anisotropic property at room temperature, and has properties that the optically anisotropic property varies with application (or variation) of electric field, magnetic field or heat energy. Further, the film shows improved heat resistance, and therefore a liquid crystal cell in which the film is incorporated in stead of a liquid crystalline layer also show excellent heat resistance.

Particularly, in the case that a mixture containing the discotic compound set forth in the preferred examples mentioned previously (G-13 to G-24, H-1 to H-12, J-1 to J-12, K-1 to K-12, L-1 to L-7, M-1 to M-7, N-1 to N-7, O-1 to O-7), is coated on the orientation film (e.g., rubbed polyimide film) and heated to a temperature of not lower than temperature for forming the discotic nematic phase or monoaxial columnar phase, the discotic compound is easily oriented. Further, when the oriented layer is cooled, the layer is capable of retaining stably the orientation condition in glassy state. In the oriented layer in glassy state, it is estimated that the discotic plane of the discotic compound is obliquely oriented along rubbing direction of the orientation film from measurement of anisotropy of the oriented layer. In more detail, the discotic plane of the discotic compound is tilted to the surface of the orientation film in the rubbing direction of the orientation film. Further, the orientation conditions (e.g., tilted angle) can be controlled by adding other appropriate organic compound to the discotic liquid crystalline compound. Such a film of the invention is naturally useful as an optical compensatory sheet.

The orientation film is generally provided on the support as mentioned above. The orientation film has a function of defining an orientation direction of a discotic liquid crystalline compound provided thereon, and the orientation gives an optic axis tilted from the surface of the orientation film. As the orientation film, any layers can be employed so long as they are capable of imparting orientation property to a layer of discotic compound. Preferred examples of the orientation film include a layer of an organic compound (preferably polymer) subjected to rubbing treatment and an obliquely deposited layer of an inorganic compound.

Preferred examples of polymers for the orientation film include polyimide, polystyrene, gelatin, polyvinyl alcohol and polyvinyl alcohol having an alkyl group (preferably having 6 or more carbon atoms). Orientation films obtained by subjecting layers of these polymers to orientation treatment (e.g., rubbing treatment), are capable of tilting obliquely discotic liquid crystalline compound. Further, a silylated agent treated glass plate or a directly rubbed glass plate can be employed as the support having the orientation film. Furthermore, poll;vinyl alcohol layer which is stretched 4 to 5 times can be employed instead of the rubbed orientation film.

The rubbing treatment is conducted by rubbing the surface of the polymer layer in a certain direction by the use of paper, gauze, felt, rubber, or fiber of polyamide or polyester. The rubbing procedure is generally performed by rubbing a surface of the orientation film in several times using cloth.

As the orientation film, an obliquely deposited layer of an inorganic compound is also employable as mentioned above. Examples of the inorganic compounds include metal oxides or metal fluorides such as $SiO$, $TiO_2$, $MgF_2$ and $ZnO_2$ and metals such as Au and Al (preferably SiO).

Other methods for orienting a layer of discotic compound having liquid crystalline property with using no orientation film, include those applying magnetic field or electric field to the layer provided on a support at desired angle under heating at a temperature for forming discotic nematic phase.

In the preparation of the film, the polymerization of the discotic compound is generally conducted, after the layer of the discotic compound is heated on the orientation film to convert the layer to one in the mono-domain condition of monoaxial orientation. In more detail, the layer in the mono-domain condition is polymerized (preferably using photopolymerization initiator) by means of radiation of light, or the layer is further heated at higher temperature to be polymerized. For example, a layer of a discotic compound having an epoxy group is heated so as to form the mono-domain condition and can be polymerized through cationic polymerization by means of radiation of light, or the layer in the mono-domain condition can be further heated at higher temperature by tens degrees than the temperature forming the mono-domain condition to be polymerized.

The polymerization of the discotic compound is preferably conducted through radical or cationic polymerization by means of radiation of light (preferably ultraviolet (UV) light) from the viewpoint of productivity.

For polymerizing the layer, the mixture containing the discotic compound preferably contains photopolymerization initiator or (heat)polymerization initiator. Preferred groups in the polymerizing include vinyl, acryloyl and epoxy.

Examples of the photopolymerization initiator include $\alpha$-carbonyl compounds seen in U.S. Pat. Nos. 2,367,661 and 2,367,670, acyloin ethers described in U.S. Pat. No. 2,448, 828, aromatic acyloin ethers substituted with $\alpha$-hydrocarbon group described in U.S. Pat. No. 2,722,512, multi-nuclei quinone compounds described in U.S. Pat. No. 3,046,127 and U.S. Pat. No. 2,951,758, a combination of triarylimidazole and p-aminophenylketone described in U.S. Pat. No. 3,549,367, acridine and phenazine compounds described in U.S. Pat. No. 4,239,850, and oxadiazole compounds described in U.S. Pat. No. 4,212,970.

The amount of the photopolymerization initiator preferably is in the range of 0.01 to 20 weight parts, especially 0.5 to 5 weight parts, based on the total solid amount. Addition of excess amount of initiator unnecessarily cuts off light.

If desired, the mixture (solution) containing the discotic compound (and the liquid crystalline compound) may contain various amine compounds. Examples of the amine compounds include triethanolamine, diethanoleaniline, ethyl ester of p-dimethylaminobenzoic acid and Michler's ketone. The amount of the amine compound preferably is in the range of 50 to 200 weight parts, based on the amount of the photopolymerization initiator. Further, compounds of hydrogen donor such as N-phenylglycine, 2-mercaptobenzothiazole and alkyl ester of N,N-dialkylaminobenzoic acid may be added to the mixture. Furthermore, a small amount of surface active agent may be added to the mixture to depress inhibition of polymerization by oxygen.

Examples of UV-activating cationic catalysts for discotic compound having epoxy group include allyldiazonium salts (e.g., hexafluorophosphate and tetrafluoroborate), diallyliodonium salt, allylonium salt of VII group (e.g., allylosulfonium salt having anion such as $PF_6$, $AsF_6$ or $SbF_6$.

Examples of light radiation for polymerization include electron beam, UV light, visible ray and infrared ray (heat radiation). Preferred is UV light. Examples of light source of the UV light include low-pressure mercury lamp (e.g., germicide, fluorescent chemical lamp or black lamp), high-pressure discharge lamp (e.g., high-pressure mercury lamp or metal halide lamp), and short-arc discharge lamp (super high-pressure mercury lamp, xenon lamp or mercury-xenon lamp).

For example, in the case of employing the high-pressure mercury lamp, irradiation is generally conducted in intensity of irradiation of 20 to 5,000 mJ, and preferably 100 to 800 mJ.

For example, discotic compounds (e.g., benzoyloxytriphenylene compounds) have $\lambda$max at wavelength of not more than 274 nm, and therefore light source emitting UV light at short wavelengths (e.g., 254 nm) is not suitably employed. Hence, preferred are the photopolymerization initiator having light absorption in region of near ultraviolet and light source emitting light in region of near ultraviolet (high-pressure mercury lamp or metal halide lamp).

Preferred examples of the photopolymerization initiator are as follows:

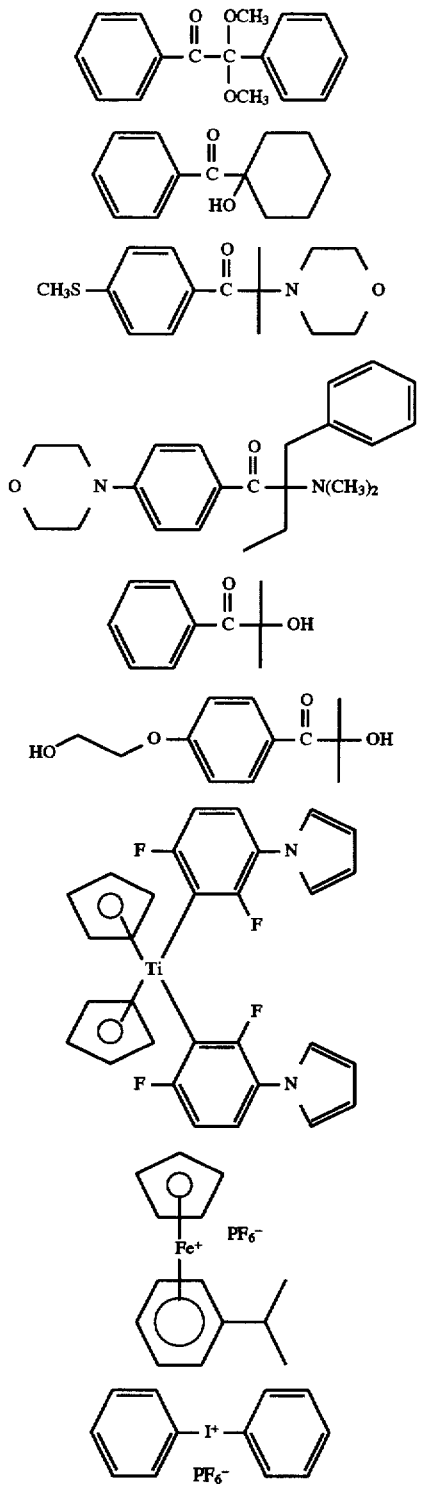

In the case that the polymerization is conducted by means of heat energy, temperature for heating generally is in the range of 50° to 250° C. and time period generally is 0.1 to 60 minutes.

The mixture containing the discotic compound (and the liquid crystalline compound) is generally dissolved in a solvent to prepare a solution for forming the composite material. The solution is generally coated on the support or the orientation film thereon.

Examples of solvents employable for dissolving the compounds therein, include polar solvents such as N,N-dimethylformamide (DMF), dimethyl sulfoxide (DMSO) and pyridine, nonpolar solvents such as benzene and hexane, alkyl halides such as chloroform and dichloromethane, esters such as methyl acetate and butyl acetate, ketones such as acetone and methyl ethyl ketone, and ethers such tetrahydrofuran and 1,2-dimethoxyethane. Preferred are alkyl halides and ketones. The solvents may be employed singly or in combination.

As material of the support on which the orientation film or the film is provided, any materials are employable. The support preferably has even surface.

The support preferably is a film which is prepared from triacetyl cellulose, polycarbonate, polyarylate, polysulfone or polyethersulfone. Further, metal film is employable.

The film containing liquid crystalline compound of the invention obtained by the above process has a structure comprising the oriented polymer matrix and the liquid crystalline compound contained therein. The film is preferably composed of oriented polymer matrix obtained by polymerization of the discotic compound and the liquid crystalline compound therein as is apparent in the process. The oriented polymer matrix of the film has optically anisotropic layer and property (force) capable of defining orientation of the liquid crystalline compound. The liquid crystalline compound of the film is contained in the space between polymer chains constituting the polymer matrix (e.g., the space produced between two or more piles of the oriented discotic planes of the polymer matrix), and therefore the liquid crystalline compound receives the orientation defining force of the polymer matrix to show orientation condition in the mono-domain with maintaining its inherent orientation property. Thus, the polymer matrix of the invention is an orientation film which is formed three-dimensionally, whereas the conventional orientation film is a planner layer. Therefore, the polymer matrix is capable of showing three-dimensionally the orientation defining force for the liquid crystalline compound.

The orientation of the liquid crystalline compound (e.g., in the liquid crystal cell) is generally formed as follows:

The conventional orientation film has the orientation defining force for the liquid crystalline compound which is reduced in the thickness direction. Under the condition that the total energy of the orientation defining force and the intermolecular forces of the liquid crystalline compounds is approximately equal to the energy of the thermal fluctuation of the liquid crystalline compound, the orientation of the liquid crystalline compound is formed.

In the liquid crystal cell, thus, a thickness of the liquid crystal layer (i.e., a gap between the glass plates) is designed within the range to which the orientation defining force of the orientation film extends. In contrast, a thickness of the film having liquid crystalline property of the invention is scarcely limited as above because the orientation defining force produced by the polymer matrix extends over the whole composite material.

In the known film which are composed of the polymer matrix and the liquid crystalline compound therein, however, the polymer matrix is composed of conventional polymer having no liquid crystalline property and therefore it does not show the orientation defining force against the liquid crystalline compound. The polymer matrix only functions as spacer retaining the gap between the glass plates.

The representative structure of the liquid crystal display of the invention is shown in FIG. 1. In FIG. 1, a liquid crystal cell comprising a pair of substrates 13a and 13b provided with a transparent electrode 14a and 14b and a film 15 (comprising an oriented polymer matrix and liquid crystalline compound) disposed therebetween, and a pair of polarizing sheets 11a and 11b arranged on the both sides of the cell are assembled to constitute the liquid crystal display. A back light is generally arranged under the polarizing sheet 11a.

The liquid crystal display shown in FIG. 1 is a representative structure of TN-LCD which employs a twist-oriented nematic liquid crystalline compound as liquid crystal. The structure of FIG. 1 is also utilized for various display devices (e.g., STN-LCD). The polarizing sheets may be not arranged, and such a liquid crystal cell is employed for LCD according to DS mode (Dynamic Scattering Mode).

The film of the invention can be applied to various liquid crystal displays by changing the kind of liquid crystalline compound appropriately.

As material of the substrate of the liquid crystal cell, materials having transparent are preferred. The material preferably shows optical isotropy.

The support preferably is glass plate or a film which is prepared from materials having a small intrinsic birefringence, such as triacetyl cellulose. Such material is available on market by the trade name of Geonex (from Nippon Geon Co., Ltd.), Arton (from Japan Synthetic Rubber Co., Ltd.) and Fuji TAC (from Fuji Photo Film Co., Ltd.).

However, materials having a large intrinsic birefringence such as polycarbonate, polyarylate, polysulfone and polyethersulfone can be also employed by rendering the materials optically isotropic by appropriately controlling molecular orientation in a procedure of forming a film.

Examples of the present invention and comparison examples are given below, but these examples by no means restrict the invention.

EXAMPLE 1
Preparation of film containing liquid crystalline compound

On a subbing layer of gelatin (0.1 μm) provided on triacetylcellulose (TAC) film (thickness: 127 μm; size: 100 mm×100 mm, Fuji Tack, available from Fuji Photo Film Co., Ltd.), a coating solution of modified polyvinyl alcohol was coated, to form a polyvinyl alcohol layer and rubbing a surface of the layer using a rubbing machine to form an orientation film.

The discotic compound G-14 (compound previously mentioned) as a polymerizable discotic compound having liquid crystalline property and liquid crystal composition (trade name: E-8, available from Merck Co., & Ltd.) were mixed at a ratio of 9:1 (compound:composition) by weight to prepare a mixture of the discotic compound and liquid crystal composition. Further, as photopolymerization initiator, Michler's ketone and benzophenone (0.5 weight % based on the weight of the mixture, respectively) were added to the above mixture and the resultant mixture was dissolved in methyl ethyl ketone to form a coating solution (10 weight %).

The coating solution was coated on the orientation film at 1,000 rpm using a spin-coater to form a discotic compound layer.

The discotic compound layer was heated at speed of 10° C./min. When the temperature reached to 100° C., it was observed by a polarizing microscope that the layer was almost in mono-domain orientation.

Then, the support having the discotic compound layer (composite) was allowed to stand at 110° C. for 2 minutes, subsequently the composite was exposed to UV light for 20 minutes using UV-light radiation machine (UVSL-58 (16W), available from ULTRA-VIOLET PRODUCTS Corporation) with maintaining the heating, and then cooled to form a cured discotic compound layer (oriented polymer matrix).

The support having the cured discotic compound layer was dipped in water of 40° C. for one hour, dried, and then the cured discotic compound layer was separated from the orientation film on the support by pulling cellophane tape attached to the edge of the cured discotic compound layer. Thus, a film containing liquid crystalline compound was obtained.

Preparation of liquid crystal display

The film having liquid crystalline compound was disposed between a pair of glass plates provided with a transparent electrode of ITO (Indium Tin Oxide) which were arranged in such as manner that the transparent electrodes faced each other, to prepare a liquid crystal cell. The liquid crystal cell was disposed between a pair of polarizing plates of which polarizing axes were at right angles each other (i.e., relationship of polarizing axes where light cannot pass through). Thus a liquid crystal display was obtained.

[Evaluation of liquid crystal display]

Light was exposed to one of the polarizing plates of the liquid crystal display. When the display was viewed from the other polarizing plate side, a distinct display was obtained on the display because light was passed through the liquid crystal display.

Subsequently, when alternating current voltage of 15 V was applied to the transparent electrode of the display, a dark display was immediately obtained (i.e., the light could not be viewed) on the display because light was not passed through the liquid crystal display. When the application of the voltage was then stopped, a distinct display was obtained on the display. Repetition of on-off of the voltage brought about that of distinct and dark displays.

Thus, it was confirmed that the film combined functions of liquid crystal (layer), orientation film and spacers in a liquid crystal cell of a conventional liquid crystal display.

EXAMPLE 2
Preparation of film containing liquid crystalline compound

A film containing liquid crystalline compound was prepared in the same manner as in Example 1.

Preparation of liquid crystal display

A liquid crystal display was prepared in the same manner as in Example 1 except employing triacetylcellulose (TAC) film (thickness: 127 μm; Fuji Tack, available from Fuji Photo Film Co., Ltd.), instead of glass plate.

[Evaluation of liquid crystal display]

The evaluation on the resultant display was conducted in the same manner as in Example 1. The results of the evaluation were the same as in Example 1.

What is claimed is:

1. A film which comprises an oriented polymer matrix formed by polymerization of at least one discotic compound having a polymerizable group and at least one liquid crystalline compound contained therein.

2. The film as defined in claim 1, wherein the discotic compound has a liquid crystalline property.

3. The film as defined in claim 1, wherein the liquid crystalline compound has no polymerizable group.

4. The film defined in claim 1, wherein the liquid crystalline compound is at least one compound selected from the group consisting of a smectic liquid crystalline compound, a nematic liquid crystalline compound, a cholesteric liquid crystalline compound, a chiral nematic liquid crystalline compound, a ferroelectric liquid crystalline compound and a diaferroelectric liquid crystalline compound.

5. The film defined in claim 1, wherein the oriented polymer matrix has optically anisotropic property.

6. The film as defined in claim 1, wherein the discotic compound has one chemical structure in the molecule selected from the group consisting of the following structures (1) to (6):

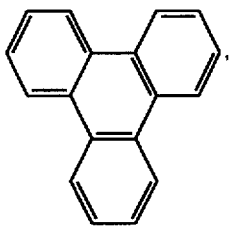
(1)

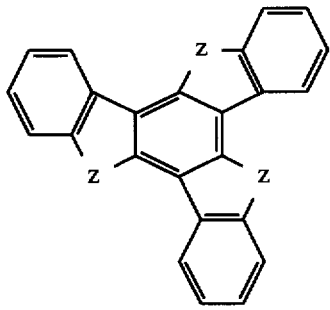
(2)

wherein Z represents —CH$_2$—, —O—, —S— or —NR$^1$— in which R$^1$ stands for alkyl of 1 to 5 carbon atoms,

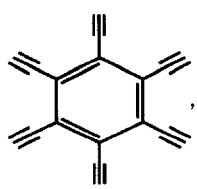
(3)

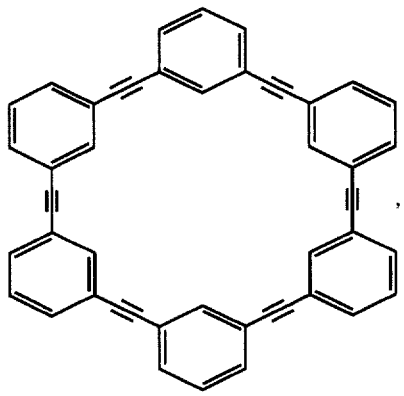
(4)

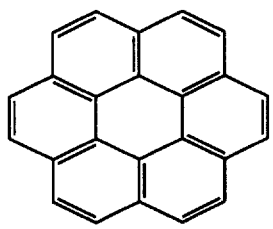
(5)

and

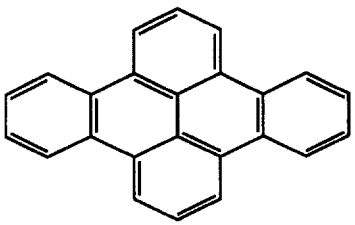
(6)

7. A process for preparation of the film of claim 1, which comprises the steps of:

forming a layer comprising a mixture of at least one discotic compound having a polymerizable group and at least one liquid crystalline compound, heating the layer of the mixture to orient the discotic compound, and applying light or heat energy to the oriented discotic compound to polymerize.

8. A process for preparation of the film of claim 1, which comprises the steps of:

forming, on an orientation film, a layer comprising a mixture of at least one discotic compound having a polymerizable group and at least one liquid crystalline compound, heating the layer of the mixture to orient the discotic compound, applying light or heat energy to the oriented discotic compound to polymerize, whereby a polymerized discotic compound layer containing liquid crystalline compound is formed, and separating the polymerized discotic compound layer from the orientation film.

9. A liquid crystal display comprising a liquid crystal cell which comprises a pair of substrates provided with a transparent electrode and the film of claim 1 disposed therebetween.

* * * * *